March 10, 1936.  B. S. FLORADAY  2,033,763
VEHICLE WINDOW VENTILATOR
Filed April 2, 1934   2 Sheets-Sheet 2
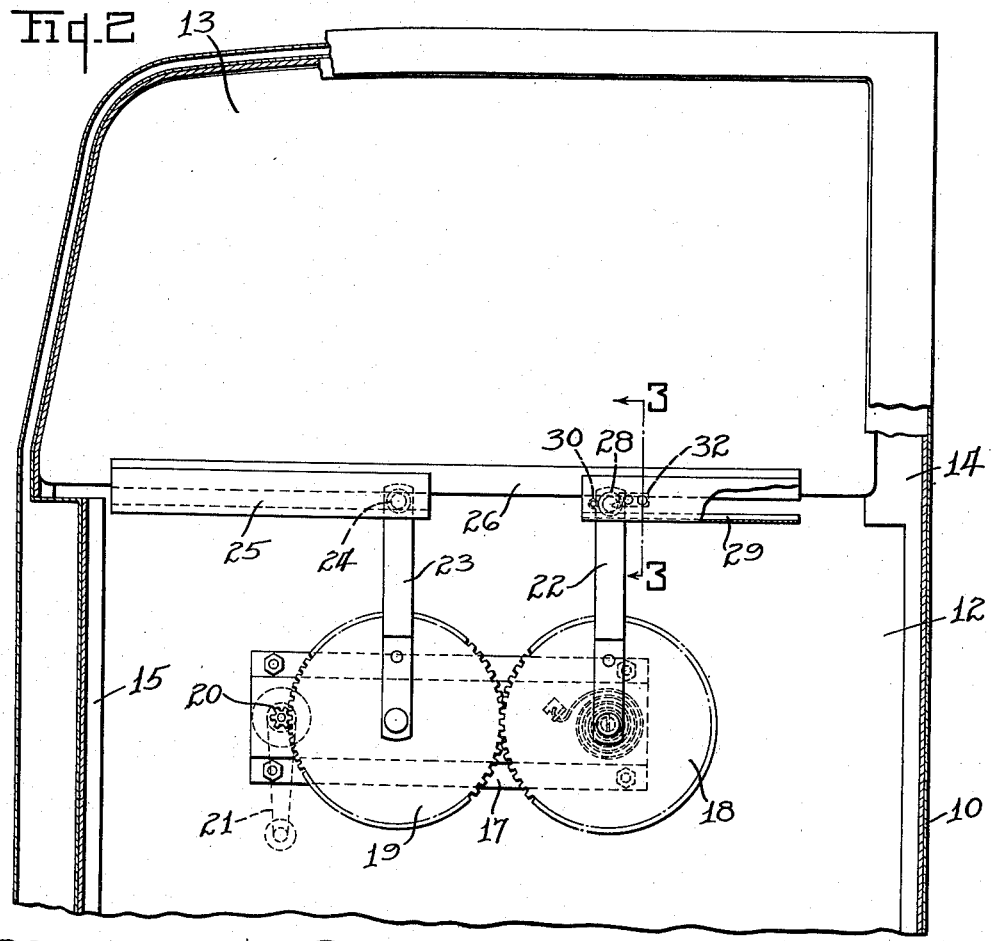
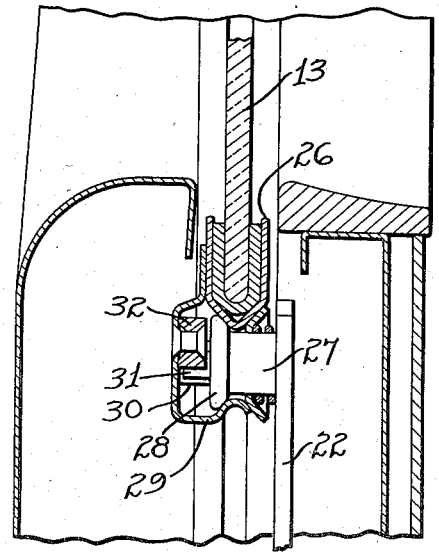
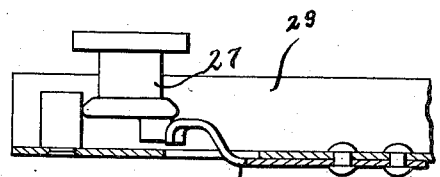
Inventor
Burton S. Floraday
By Owen & Owen
Attorneys Patented Mar. 10, 1936

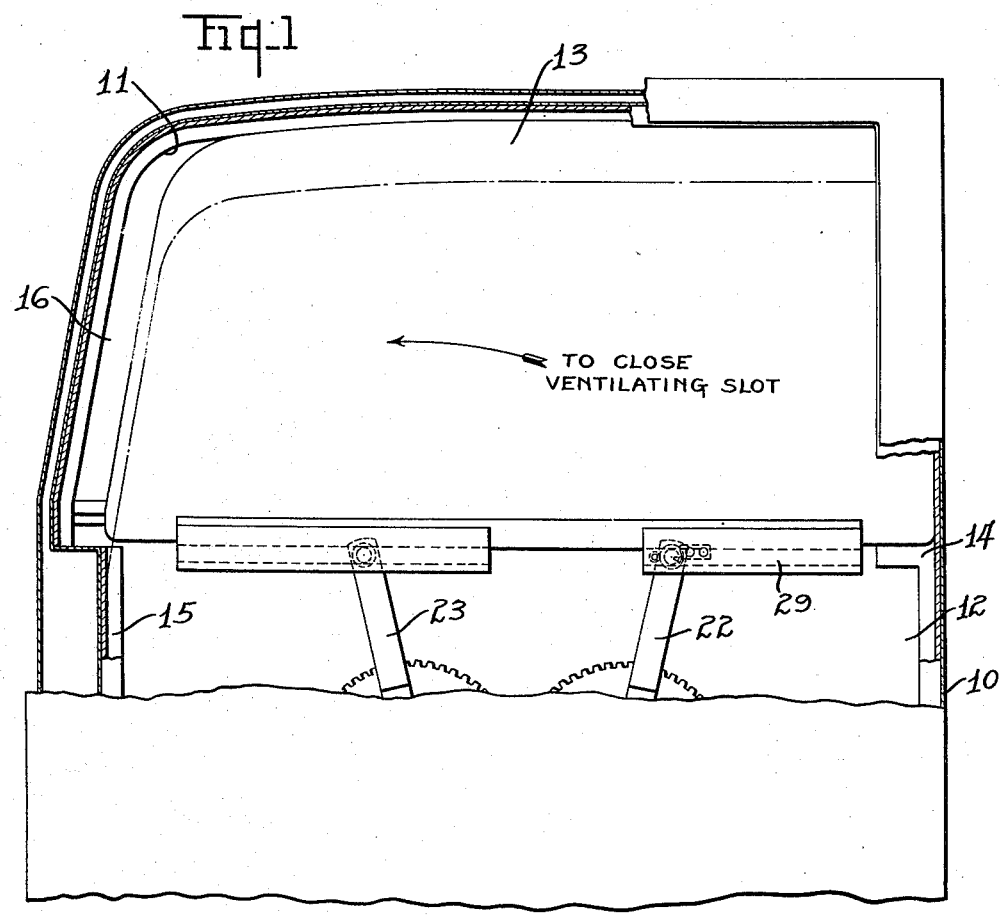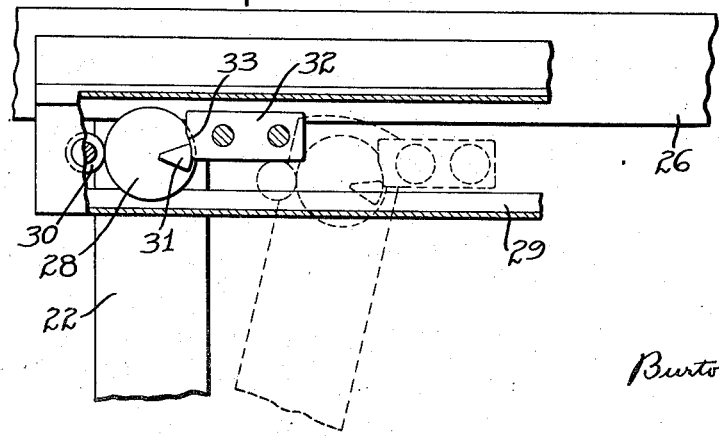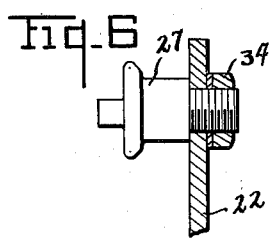

2,033,763

UNITED STATES PATENT OFFICE 2,033,763

VEHICLE WINDOW VENTILATOR

Burton S. Floraday, Toledo, Ohio, assignor, by mesne assignments, to Automobile Ventilation, Inc., Detroit, Mich., a corporation of Michigan Application April 2, 1934, Serial No. 718,543

5 Claims. (Cl. 268—126)

This invention relates to window ventilators, particularly for vehicles, such as automobiles, and is concerned with that type of ventilator which enables foul air, smoke, gases, etc., to be drawn from the inside of the vehicle while the latter is in motion.

An object is to produce a simple and efficient ventilator of the above type in which the vehicle window during the raising, and whether fully or partly raised, provides a ventilating slot between a vertical edge and the frame, thereby obtaining more effective and thorough ventilation of the inside of the vehicle, as well as enabling, in addition to the withdrawal of foul air, etc., from the inside, also the forcing of fresh outside air to the inside at such times as desired.

In one aspect, this invention provides an extremely simple and inexpensive ventilator for vehicles, particularly automobiles, and eliminates the use of wings, vanes, and other attachments, which not only add materially to the expense, but also tend to obstruct vision. According to this invention, the window, which is raised and lowered in the usual manner, has one vertical edge thereof normally spaced from the frame to provide a ventilating slot, which, if desired, can be closed by shifting the window after it is raised. These movements are preferably effected by a single manual control so that one handle is sufficient for shifting the window laterally as well as raising and lowering it. By this construction it is apparent that even though the window is only partly raised, the ventilating slot is provided, as well as an opening at the top of the window through which fresh air is introduced into the vehicle without danger of drafts, the foul air being withdrawn through the ventilating slot, as will be readily understood.

This invention is shown by way of illustration in the accompanying drawings, in which:

Figure 1 is a side elevation partly in section of a portion of an automobile door showing the window in fully raised position with the ventilating slot provided between the front vertical edge of the window and the frame;

Figure 2 is a view similar to Figure 1 but disclosing more in detail the regulator mechanism for actuating the window and showing the window shifted forwardly to close the ventilating slot;

Figure 3 is an enlarged sectional view on the line 3—3 of Figure 2;

Figure 4 is an enlarged side elevation showing the parts by which the regulator arm operates to shift the window horizontally in one direction or the other;

Figure 5 is a sectional view of an alternate form in which the spring provides one stop; and Figure 6 is a sectional view of the end of one of the regulator arms showing the mounting of the stud imparting shifting movement to the window.

The illustrated embodiment of the invention comprises an automobile door 10 having a window opening 11 and a well 12, into which the window 13 is lowered to uncover the window opening 11. Normally, the window 13 is guided in its vertical movements in side channels 14 and 15, the channel 14 being relatively deep, whereas the channel 15 is comparatively shallow. With the window 13 in such position that the right-hand edge portion (Figure 1) is disposed fully within the channel 14, a ventilating slot 16 is provided between the front vertical edge of the window 13 and the adjacent portion of the frame. It is thus apparent that during the normal raising and lowering of the window 13 the ventilating slot 16 is provided, but the slot 16 may be subsequently closed by shifting the window 13 forwardly when the latter has been raised to nearly its extreme upper position.

For effecting vertical movements of the window 13 as well as the lateral or horizontal shifting thereof, regulator mechanism is provided, which in this instance comprises a mounting plate 17 rigidly secured to the door. Mounted on the plate 17 are gears 18 and 19 which mesh with each other, and, meshing with the gear 19 is a pinion 20, which is operated by a handle crank 21. Fixed to the gears 18 and 19 are arms 22 and 23 respectively, this construction being well known in the art and referred to generally as a double arm regulator. Mounted on the outer end of the arm 23 is a stud 24, which engages in a horizontally elongate guide channel 25, which is secured to and depends from a glass channel member 26 which embraces the lower edge portion of the window 13. Mounted on the outer end of the regulator arm 22 is a stud 27 provided with an annular shoulder 28. The stud 27 engages in a horizontally elongate channel 29, which is spaced laterally from the channel 25, and is likewise fixed to the window channel 26.

It will be understood that by turning the handle 21 the arms 22 and 23 are swung toward or away from each other, such movements being operative to raise or lower the window 13 in the usual manner. When the window is raised to close the opening the arms assume substantially the position shown in Figure 1, and, as will hereinafter appear, by further turning of the handle 21 in the same direction, the window 13 will be shifted or moved forwardly in a horizontal direction to close the ventilating slot 16 and bring the front vertical edge of the window into engagement with the adjacent portion of the frame, thus moving the rear edge portion of the window laterally in the deep channel 14, although that edge of the window remains in the channel 14 when the slot is fully closed.

For effecting such shifting movement of the window 13 forwardly, a stop in the form of a roller 30 is mounted on the channel 29 in such position as to be engaged by the shoulder 28 of the stud 27. It is apparent that by swinging the arm 22 to the left of Figure 1, the shoulder 28 abutting against the roller 30 pushes or forces the window 13 laterally, and during such motion the arm 23 continues its movement to the right of Figure 1 for assisting in holding the glass in the desired position. During such shifting movement the regulator arms raise the window slightly, sufficient clearance in the upper part of the door being provided for this purpose.

It is to be understood that the period at which the window starts to move laterally is dependent upon the position of the stop roller 30, and, if desired, the initial shifting movement of the window may take place before the window has covered the opening, or at any other point desired.

Fixed to the outer face of the annular shoulder or flange 28 is a wedge shaped piece 31, the wider portion of the wedge facing toward the rear of the door when the arms are in raised position. Riveted, or otherwise suitably secured to the channel 29, is another stop in the form of a plate 32, which is spaced laterally from the stop roller 30. The forward edge 33 of the plate 32 is rounded, as indicated in Figure 4.

In operation, the regulator mechanism is actuated to move the arms toward each other to raise the window, the regulator arm 22 swinging in a counterclockwise direction until the annular flange 28 abuts against the stop roller 30, and continued movement of the regulator arm serves to shift the window 13 horizontally to move the front vertical edge thereof into engagement with the adjacent portion of the frame. Obviously, the window can be forced tightly against the frame securely to close the opening and to secure a satisfactory seal. During such movement of the arm 22 to the left, the arm 23 moves to the right (Figure 1) guiding the shifting movement of the window, and also the arms slightly elevate the window during such movement, as will readily be apparent. It is to be understood that the positioning of the stop roller 30 determines the period in the vertical movement at which the window may be shifted horizontally. If desired, such shifting movement may take place before the window reaches its closed position.

Upon turning the crank handle 21 in the opposite direction or in the direction to lower the window 13, the arm 22 swings in a clockwise direction (Figure 4), at which time the wedge shaped piece 31 abuts against the plate 32 so that continued swinging movement of the arm 22 shifts the window 13 horizontally to its normal position with the right hand edge portion disposed fully into the channel 14. It is apparent that during such swinging movement of the arm 22, the angular relation of the wedge shaped piece 31 with respect to the stop plate 32 gradually changes to such an extent that upon the window 13 reaching its normal position and at the point where the window is prepared to move vertically downward, the wedge piece 31, as shown by the dotted lines in Figure 4, is adapted to pass freely over the stop plate 32 so that upon continued actuation of the window regulator mechanism the arm 22 functions to lower the window. Further actuation of the crank handle 21 operates to lower the window, the dash and dot line on Figure 1 showing the position assumed by the window during its vertical movements, at which time the ventilating slot 16 is provided.

It will be understood that the stud 27 is securely fixed to the arm 22, but, as indicated in Figure 6, may be held in place by a nut 34, so that some adjustment is afforded to obtain the proper positioning of the wedge shaped piece 31, as will be readily understood.

In the alternate form shown in Figure 5, a spring arm 35 secured by rivets to the channel 29, may be used in place of the stop plates 32. As indicated, the free end of the spring 35 is substantially U-shaped, and is adapted to be engaged by the wedge piece 31. When the window 13 reaches its normal position in the channel 14, further actuation of the regulator mechanism will overcome the resistance of the spring 35 and allow the wedge piece 31 to pass over the spring 35, thereby to enable the window to be lowered in the usual manner.

It is to be understood that numerous changes in details of construction, arrangement and operation may be effected without departing from the spirit of the invention, especially as defined in the appended claims.

What I claim as new and desire to secure by Letters Patent is:

1. In a vehicle body having a window movable vertically in a window frame and normally having one vertical edge spaced from the frame to provide a ventilating slot, regulator mechanism including a single manual control for said window for raising, lowering and shifting the same when raised to close said slot, said regulator mechanism having a swinging arm, a guide channel on the lower edge of the window with which said arm cooperates, a pair of relatively spaced stationary stops on said channel, a stud on the end of said arm engaging in said channel and engageable with one stop for shifting said window to close said slot, and a wedge-shaped piece on said stud engageable with the other stop for shifting the window to normal position and so arranged that upon return of the window to normal position the piece is adapted to freely pass the respective stop.

2. In a vehicle window ventilator including a window frame and a window in the frame normally having the front vertical edge thereof spaced a slight distance from the adjacent edge of the frame to provide a ventilating slot, regulator mechanism for raising and lowering the window and including a swinging arm, a pair of stops in fixed relation to the window and successively engaged by a part on said arm to shift the window horizontally in the direction to close the slot and to return the window to normal position, one of said stops being adapted to yield after the window is returned to normal position to enable said arm to operate to lower the window.

3. In a vehicle body having a window mounted for vertical movement and also horizontal movement in its plane when in raised position into and out of position to provide a ventilating slot at its forward edge, regulator mechanism including a retainer at the lower edge of the glass having a guideway, a swinging arm having a stud slidable in said guideway, a stop in said guideway, and a projection on said stud engageable with said stop during a predetermined time for shifting the window in one horizontal direction in its plane and disengageable at another time to permit vertical movement of the window.

4. In a vehicle body having a window mounted for vertical movement and also horizontal movement in its plane when in raised position into and out of position to provide a ventilating slot at its forward edge, regulator mechanism including a retainer at the lower edge of the glass having a guideway, a swinging arm having a stud slidable in said guideway, a stop in said guideway, and a projection on said stud engageable with said stop during a predetermined time for shifting the window in one horizontal direction in its plane and disengageable at another time to permit vertical movement of the window, said stop being yieldable under predetermined pressure to permit the passage of said projection thereby.

5. In a vehicle body having a window mounted for vertical movement and also horizontal movement in its plane when in raised position into and out of position to provide a ventilating slot at its forward edge, regulator mechanism including a retainer at the lower edge of the glass having a guideway, a swinging arm having a stud slidable in said guideway, a stop in said guideway, and a projection on said stud engageable with said stop during a predetermined time for shifting the window in one horizontal direction in its plane and disengageable at another time to permit vertical movement of the window, said stop being fixed to said retainer and being so positioned as to permit the passage thereby of said projection upon completion of said horizontal movement of the glass.

BURTON S. FLORADAY.